US012350549B2

(12) United States Patent
Boddie

(10) Patent No.: US 12,350,549 B2
(45) Date of Patent: Jul. 8, 2025

(54) TRAINING AND REHABILITATION DEVICE

(71) Applicant: MY TOTAL SHOULDER, INC., Pembroke, MA (US)

(72) Inventor: Micolene Boddie, Norwell, MA (US)

(73) Assignee: MY TOTAL SHOULDER, INC., Pembroke, MA (US)

( * ) Notice: Subject to any disclaimer, the term of this patent is extended or adjusted under 35 U.S.C. 154(b) by 317 days.

(21) Appl. No.: 17/903,358

(22) Filed: Sep. 6, 2022

(65) Prior Publication Data

US 2022/0409958 A1 Dec. 29, 2022

Related U.S. Application Data

(63) Continuation-in-part of application No. 17/844,862, filed on Jun. 21, 2022, now Pat. No. 11,878,211, (Continued)

(51) Int. Cl.
*A63B 23/12* (2006.01)
*A61H 1/02* (2006.01)
(Continued)

(52) U.S. Cl.
CPC ....... *A63B 23/1245* (2013.01); *A61H 1/0281* (2013.01); *A63B 21/0552* (2013.01); *A63B 21/4049* (2015.10); *A63B 24/0062* (2013.01); *A63B 24/0087* (2013.01); *A61H 2201/1261* (2013.01); *A61H 2201/1623* (2013.01); *A61H 2201/1638* (2013.01); *A61H 2203/0406* (2013.01); *A61H 2203/0431* (2013.01); (Continued)

(58) Field of Classification Search
CPC ............ A63B 23/1245; A63B 24/0087; A63B 71/0054; A63B 21/0552; A63B 21/4049; A63B 24/0062; A63B 2071/0072; A63B 2213/00; A63B 2208/0242; A63B 2208/0204; A61H 1/0274; A61H 1/0281; A61H 2201/1215; A61H 2201/5069; A61H 1/0277; A61H 2201/1635; A61H 2201/1642; A61H 2201/1638; A61H 2201/1676; A61H 1/0285; A61H 2205/00
USPC ................................................ 482/4; 601/33
See application file for complete search history.

(56) References Cited

U.S. PATENT DOCUMENTS 839,991 A 1/1907 Cox
2,760,774 A 8/1956 Perez
(Continued)

FOREIGN PATENT DOCUMENTS

CN 102292060 1/2009
CN 10559790 1/2016
(Continued)

OTHER PUBLICATIONS

USPTO Non-Final office action dated Apr. 24, 2024. U.S. Appl. No. 17/865,468.

*Primary Examiner* — Andrew S Lo
(74) *Attorney, Agent, or Firm* — Troutman Pepper Locke LLP

(57) ABSTRACT

A device for training and rehabilitation of a limb is provided. The device provides a board with a plurality of movement tracks to allow for controlled movement of the limb in various directions. Blockers and other controlling structures may be arranged on the device to limit range of motion of the movement of the limb.

19 Claims, 10 Drawing Sheets

Related U.S. Application Data which is a continuation of application No. 16/531,994, filed on Aug. 5, 2019, now Pat. No. 11,383,129, which is a continuation of application No. 15/351,013, filed on Nov. 14, 2016, now Pat. No. 10,413,778.

(51) Int. Cl.

| | |
|---|---|
| ***A63B 21/00*** | (2006.01) |
| ***A63B 21/055*** | (2006.01) |
| ***A63B 24/00*** | (2006.01) |

(52) U.S. Cl.

CPC ................ *A61H 2203/0456* (2013.01); *A63B 2208/0204* (2013.01); *A63B 2208/0242* (2013.01); *A63B 2213/00* (2013.01)

(56) References Cited

U.S. PATENT DOCUMENTS

| | | | | |
|---|---|---|---|---|
| 3,163,161 | A | 12/1964 | Courtin | |
| 3,662,602 | A | 5/1972 | Weiss | |
| 4,089,520 | A | 5/1978 | Ozbey | |
| 4,108,429 | A | 8/1978 | Minichiello | |
| 4,746,167 | A | 5/1988 | Palmer | |
| 4,772,015 | A | 9/1988 | Carlson | |
| 4,822,027 | A | 4/1989 | Kascak | |
| 4,944,502 | A | 7/1990 | Collins | |
| 4,944,508 | A | 7/1990 | Collins | |
| 5,241,952 | A | 9/1993 | Ortiz | |
| 5,251,644 | A | 10/1993 | Fitzgerald | |
| 5,374,226 | A | 12/1994 | Grahm | |
| 5,391,132 | A | 2/1995 | Greenwald | |
| D361,621 | S | 8/1995 | Johnson | |
| 5,520,615 | A | 5/1996 | Fontana | |
| 5,549,520 | A | 8/1996 | Grahm | |
| 5,645,521 | A | 7/1997 | Hepburn | |
| 5,713,370 | A | 2/1998 | Cook | |
| 6,007,500 | A | 12/1999 | Quintinskie, Jr. | |
| 8,251,879 | B2 | 8/2012 | Binns | |
| 8,272,089 | B1 | 9/2012 | Stokes | |
| 8,425,437 | B2 | 4/2013 | Zaborowski | |
| 8,545,373 | B2 | 10/2013 | Borden | |
| 8,612,010 | B2 | 12/2013 | Simmons | |
| 9,248,330 | B1 | 2/2016 | Ghanem | |
| 9,604,094 | B2 | 3/2017 | Kosyan | |
| 10,391,350 | B2 | 8/2019 | Thorpe | |
| 10,413,778 | B2 | 9/2019 | Boddie | |
| 11,383,129 | B2 | 7/2022 | Boddie | |
| 11,638,670 | B1 | 5/2023 | Volz | |
| 2002/0107116 | A1 | 8/2002 | Schulz | |
| 2003/0028130 | A1 | 2/2003 | Wunderly | |
| 2006/0294564 | A1 * | 12/2006 | Guillorit | H04N 21/4788 725/108 |
| 2008/0248927 | A1 | 10/2008 | Ivey | |
| 2010/0130893 | A1 * | 5/2010 | Sankai | A63B 23/0494 600/587 |
| 2010/0234776 | A1 | 9/2010 | Borden | |
| 2011/0230800 | A1 | 9/2011 | Binns | |
| 2011/0300994 | A1 | 12/2011 | Verkaaik | |
| 2011/0319232 | A1 | 12/2011 | Thorpe | |
| 2013/0284182 | A1 | 10/2013 | Valdez | |
| 2014/0094721 | A1 * | 4/2014 | Diallo | A63B 24/0087 601/5 |
| 2014/0296654 | A1 | 10/2014 | Breen | |
| 2015/0238817 | A1 * | 8/2015 | Watterson | A63B 23/0476 482/8 |
| 2016/0089571 | A1 * | 3/2016 | Wesley | A61B 5/1071 482/8 |
| 2018/0055708 | A1 | 3/2018 | Hatch | |
| 2018/0133546 | A1 | 5/2018 | Boddie | |
| 2018/0264312 | A1 * | 9/2018 | Pompile | A63B 21/4049 |

FOREIGN PATENT DOCUMENTS

| | | |
|---|---|---|
| WO | 1986003981 | 7/1986 |
| WO | 20140109717 | 7/2014 |

* cited by examiner

TRAINING AND REHABILITATION DEVICE

BACKGROUND OF THE INVENTION

Field of the Invention

The present invention relates generally to devices for physical training and rehabilitation. More particularly the present invention relates to a device that controls multiple motions and ranges of motions for the purposes of physical training and/or rehabilitation of a body part or joints of the body part.

Description of Related Art

After many types of injuries, physical therapy is required to restore an injured member to previous capability. Commonly, various exercise devices or activities may be used by the therapist to achieve this restored functionality.

Shoulder injuries are common injuries treated by therapy. The shoulder joint is very complex and subject to a number of motions, actions, and activities that can cause injury. Because of the complexity of the shoulder and its myriad movements, rehabilitation in a controlled, isolated, and specific manner can often be quite difficult. Further, when rehabilitating the shoulder, specific limited movement ranges are generally desired. However, existing treatments at best only estimate these movement ranges.

Therefore, what is needed is a limb rehabilitation device that can specifically control movement ranges in a number of different movement direction.

SUMMARY OF THE INVENTION

The subject matter of this application may involve, in some cases, interrelated products, alternative solutions to a particular problem, and/or a plurality of different uses of a single system or article.

In one aspect, a device for guided limb movement is provided. The device comprises a limb movement board. On this board are a plurality of track apertures along one or more movement ranges of the limb. A blocker is positionable on the board to limit movement along one or more of the plurality of track apertures. A limb rest/stabilizer is connected to the board and is movable along one of the plurality of movement ranges. As such, a limb may be positioned on the limb rest/stabilizer, and may be moved along the one of the plurality of tracks that define the movement ranges. In this manner, a controlled movement of the limb and/or joint being trained or rehabilitated can be achieved.

In another aspect, a device for guided shoulder training is provided. The device has a limb movement board over which an arm may move for controlled and guided shoulder training and/or rehabilitation. An arm stabilizer configured to receive an arm of the user is connected to the board and is movable along at least one of a plurality of movement ranges. A blocker is positionable on the board. This blocker is positioned to limit a motion of the arm stabilizer by blocking the arm stabilizer path when moving along the at least one of the plurality of movement ranges. In a particular embodiment, the arm stabilizer is pivotally movable along a top surface of the board, and is pivotally connected to the board at a proximal end such that a swiveling motion of the arm stabilizer is provided.

DETAILED DESCRIPTION

Figure 1:
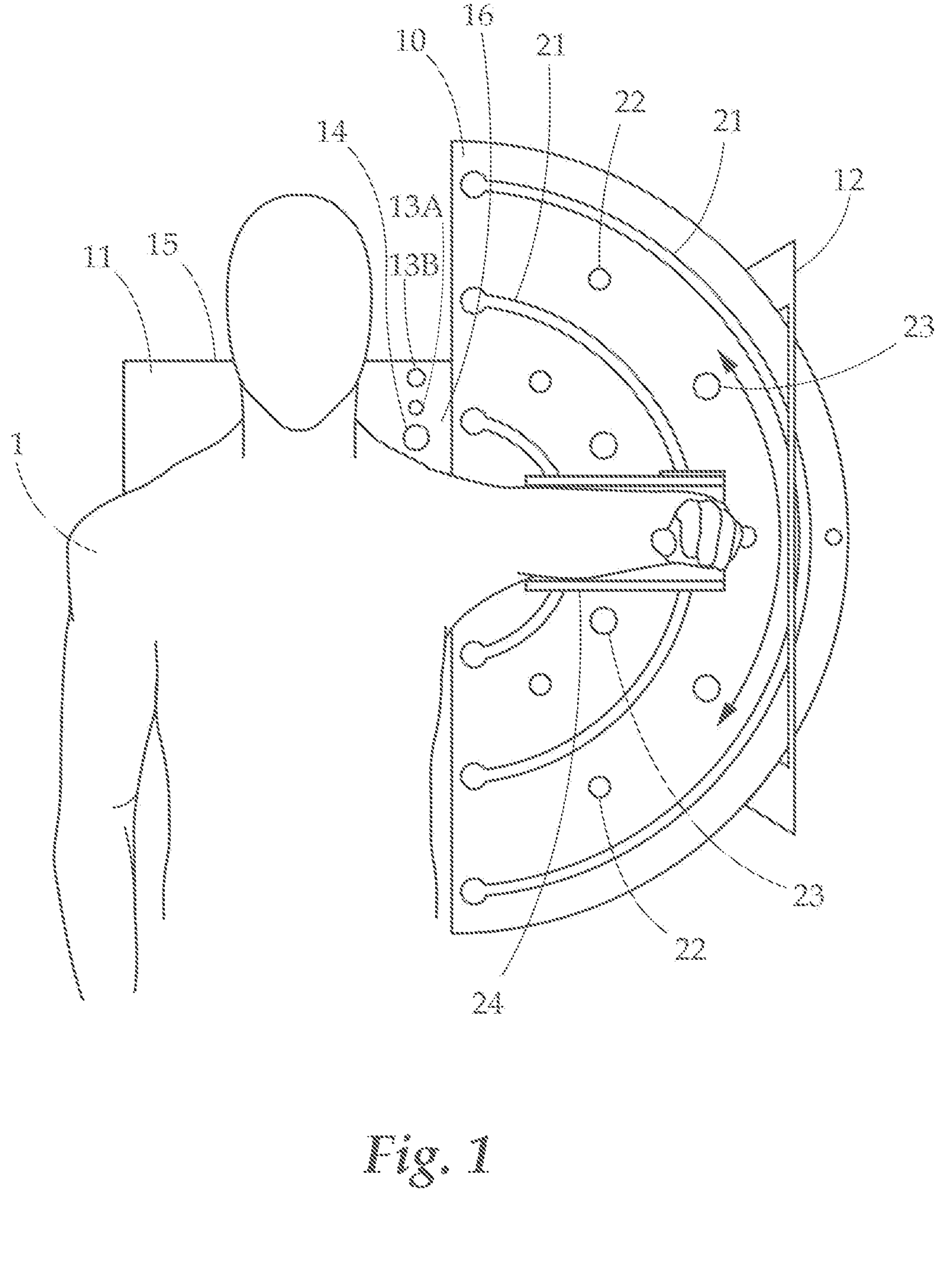
FIG. 1 provides an elevation view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an adjustable board that allows controlled and customizable ranges of motion of a limb along a top surface of the board. In further embodiments, an axial rotation track may be provided to provide controlled and customizable axial ranges of motion of the limb. In varying embodiments, the board may utilize pegs or similar blockers to limit movement of the limb on the board. Further, tracks may be provided in the board to guide and control proper movement of the limb. During use, the limb may be positioned on a stabilizer which may be connected to the board directly, via one or more of the tracks, in a pivotable manner, or connected to the axial rotation track, among other options.

In a particular embodiment, the present invention may be used as a shoulder rehabilitation device. In this embodiment, the board, along with controlling blockers and tracks, may be used to aid and strengthen shoulder adduction and abduction. An arm stabilizer may be movable in limited or free motion on this board. Further, the axial track may be utilized to aid and strengthen internal and external shoulder rotation in a guided fashion along this track. Further, the track may be adjusted to be at various angles of shoulder adduction or abduction so that rotation may be aided and strengthened at these various angles. The board on which the arm stabilizer rests on may be adjusted to allow for movement in different planes of rotation, such as in the scapular plane.

In some embodiments, a goniometer may be utilized on parts of the present invention to control movement and identify appropriate movement ranges. Further, the goniometer may be controllable to program or set the ranges of motions through which the limb is allowed to move.

In certain embodiments, the goniometer may comprise an electronic alerting mechanism that provides an indication (such as audible, tactile, or visual) when a desired angle has been achieved or reached. Such a goniometer may be programmable depending on a user's training or rehabilitation needs, in some embodiments.

The shoulder-applied embodiment of the present invention may be used when a user is lying flat, standing up, sitting, or in any position in between. Further, the board typically may be parallel to a user's back, but in some embodiments, the board may be angled (+/−90 degrees) towards a user's front or back to adjust an angle of the arm when being trained on the machine. This angling may be achieved by, for example, a hinged or pivoting structure.

As such, the present invention provides a highly customizable tool to guide training or rehabilitation limb movement in a controlled manner. The device is highly customizable to allow for various limb motions, and ranges of motion.

Turning now to FIG. 1, an embodiment of a shoulder-implemented version of the present invention is provided. In this view a user 1 is resting on a table 11. To the user's 1 left is a board 10 removably or permanently attached to the table 11 on a side edge 16 of the table 11. As noted above, the angle of the board 10 relative to the table 11 may be adjusted, and in this view is parallel with the table. The board 10 has a semicircular shape mimicking the range of motion of the user's humerus in an abduction and adduction shoulder motion. In this embodiment, the board 10 has three tracks 21. A pin or other engaging structure (not shown) may fit into one or more of these tracks to guide motion of the arm stabilizer 24 along the tracks. As such, an abduction and adduction motion can be achieved in a controlled, guided manner using the invention (as indicated by arrows). On the table 11 are a plurality of peg holes 13A, 13B, which hold shoulder peg 14. The shoulder peg 14 prevents a user's shoulder from shrugging up when the device is in use. To accommodate for variously sized users, the shoulder peg 14 may fit into any of the plurality of peg holes 13. Accordingly, the shoulder blocker can be positioned in a number of various positions along a plane of the table, including a first position 13A and second position 13B. As can be seen, the second position 13B is closer to the top edge 15 than the first position 13A. The first position 13A and second position 13B are adjacent to one another and aligned on an axis approximately parallel to the side edge 16.

In many cases of training or rehabilitation, a limited range of motion is desired so as to not over extend a healing or training joint and corresponding muscles. To limit motion of the arm stabilizer 24, a peg 23 or series of pegs 23 (or similar blocking structures) may be placed in various peg holes 22 on the board 10. The peg holes 22 are apertures formed in the board to allow a peg 23 to rest within. Peg holes 22 are arranged at multiple various angles and places on the board. To limit and customize motion of a training user's shoulder and arm, the pegs 23 can be selectively placed on the board 10. In the embodiment shown, pegs 23 are placed to allow an approximately 30 degree range of motion in both the abducting and adducting direction.

An axial rotation track 12 is configured to allow customizable and controlled internal and external rotation on the arm and shoulder. This track 12 can be connected to the board at varying positions to adjust the angle of the rotation. In this view, the track is positioned to guide shoulder rotation when the arm is straight out. In some embodiments, the track 12 may be slideable in its connection to the board 10, allowing a user's arm to abduct or adduct, and then rotate at various positions and angles.

Figure 2:
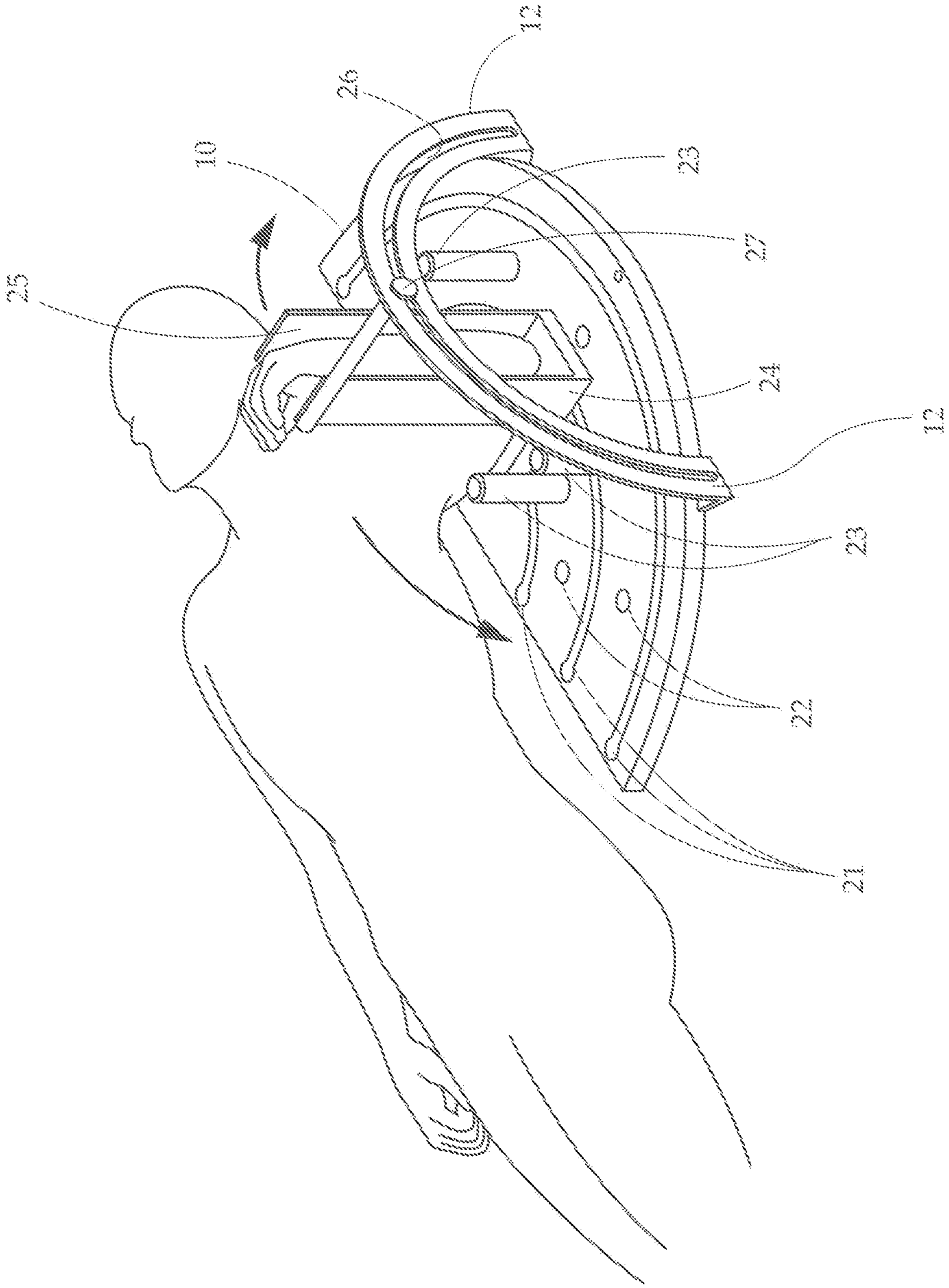
FIG. 2 provides a perspective view of another embodiment of the present invention.

FIG. 2 shows another embodiment of the present invention in perspective view. As with FIG. 1, the board 10 allows the user's 1 arm to move along its surface guided by tracks 21, and limited in motion by peg 23. Pegs 23 can be placed in various holes 22 across the board depending on the user 1 needs. In this view, the upright forearm portion 25 of the arm stabilizer 24 can be seen. This forearm portion 25 is connected or connectable to slot 26 in track 12 by connector 27. The upright forearm portion 25 may have any shape and structure so long as it provides a support to guide the forearm and/or provide a hand hold. Connector 27 can slide within slot 26. In operation of this embodiment, a user can move their arm towards a top and bottom end of the board 10 as limited by pegs 23. Further, the user can perform a full 180 degrees of internal and external rotation guided by track 12 along the full range of the slot 26. In some embodiments, blockers (not shown) may be positioned on slot 26 to limit this rotational movement.

Figure 3:
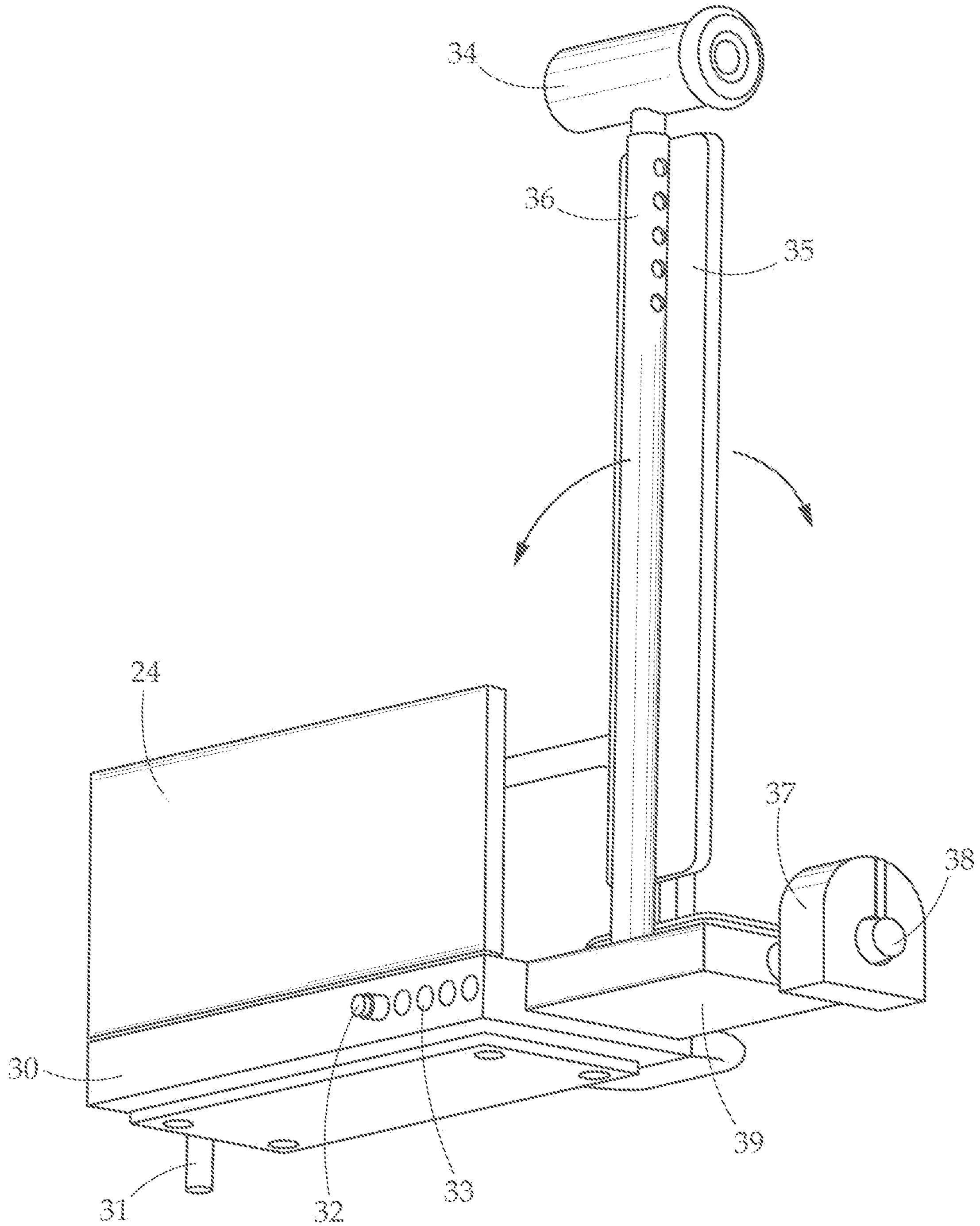
FIG. 3 provides a perspective view of still another embodiment of an arm stabilizer of the present invention.

FIG. 3 provides a view of another embodiment of the arm stabilizer. This arm stabilizer 24 is configured to provide controlled internal and external rotation itself, with or without the use the guiding rotation track 12 of the embodiment in FIG. 1. The arm stabilizer 24 has a base 30 which may slide on or above the board (not shown). A dowel 31 or similar shaft extends downward from base 30. This dowel 31 may fit into an aperture on the board (not shown) to allow for pivoting motion of the arm stabilizer 24 about the dowel 31. In other embodiments, any rotation connection (hinged, etc.) may be used to connect the arm stabilizer 24 to the board 10. An upright shaft 36 extends from the base 30 at a pivot area 39. A hand grip 34 allows a user to place their arm against forearm pad 35 to hold the grip. The upright shaft 36, and a forearm on the arm stabilizer 24 can pivot in both directions perpendicularly to the length of the arm stabilizer 24, mimicking the natural internal and external rotation of a shoulder. This movement of the upright shaft 36 is controlled by the axial rotation of shaft 38 as controlled by goniometer 37. Shaft 38, which extends through pivot area 39 into base 30, has limited or free rotation depending on a setting of goniometer 37. Goniometer 37 both measures an angle of upright shaft 36, and also is controllable (through a programming of a microchip, by arranging physical blockers, and the like) to limit rotation in certain ranges, with the maximum range being 180 degrees (90 degrees from each side of the straight up orientation shown). A programmable and reprogrammable memory may be operable to store instructions relating to a predetermined range of motion measurable and controllable by the goniometer. It should be understood that in many other embodiments, the goniometer 38 may be omitted, such that the shaft 38 simply rotates, in either a free or controlled rotation range. The shaft 38 may be anchored in base 30 and/or an end holder at a distal end of the arm stabilizer.

To account for differently sized arms, the width of the arm stabilizer 24 is adjustable. The length may be adjustable via length adjuster 33. For example, in the embodiment shown, length adjuster 33 can be set to move the shaft closer or further from the base 30. A pin 32 holds the length adjusting mechanism in place.

Figure 4:
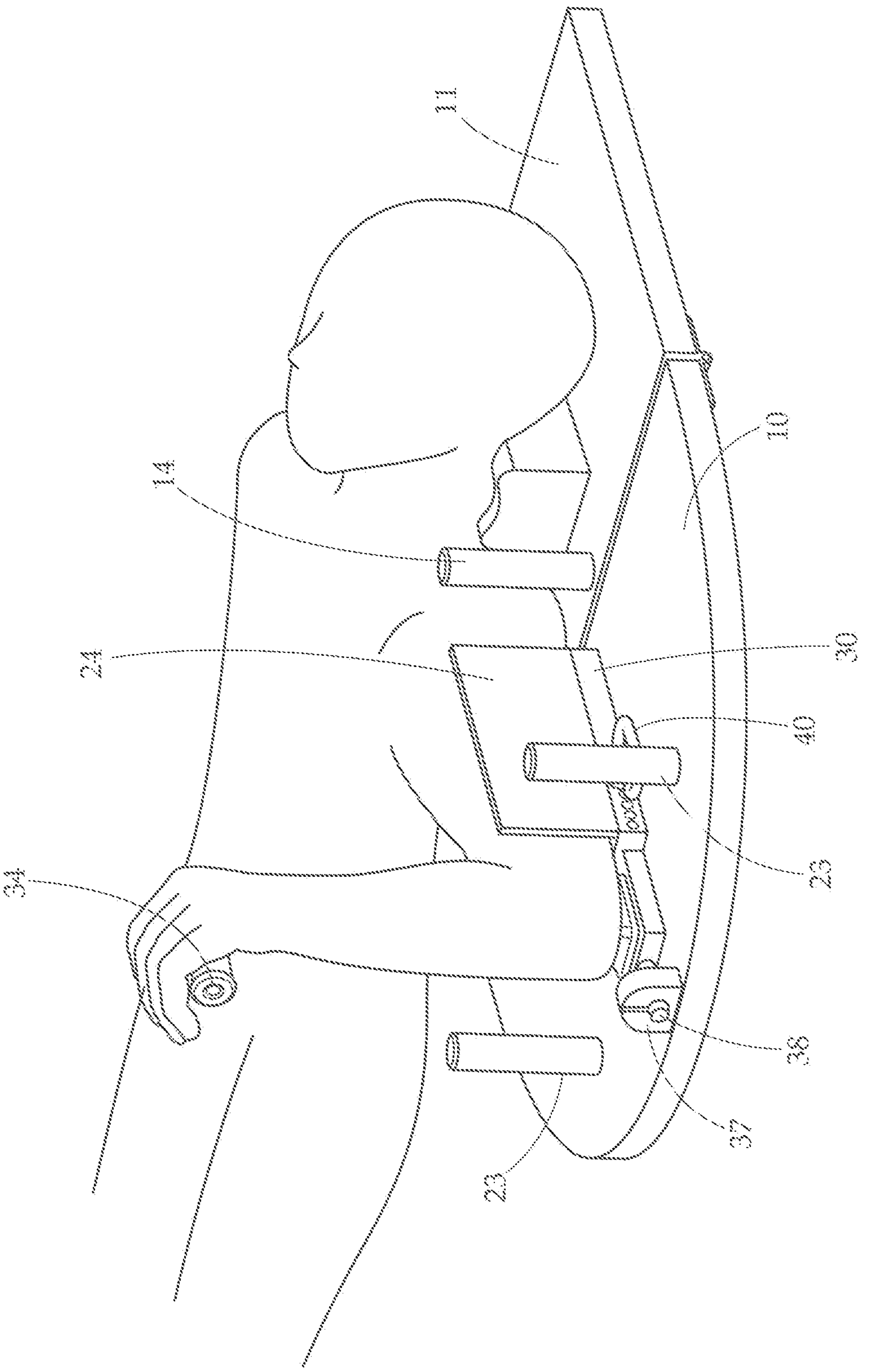
FIG. 4 provides a perspective view of yet another embodiment of the present invention.

FIG. 4 provides a perspective view of another embodiment of the present invention. This embodiment utilizes the arm stabilizer 24 of FIG. 3. The user can be seen resting against table 11. A shoulder peg 14 prevents the user from shrugging the shoulder, thereby holding the shoulder in a proper position. Board 10 is positioned next to the table 11, in this embodiment parallel with the table 11. Pegs 23 limit adduction and abduction of the arm stabilizer 24, and thus of the shoulder. In this view, a handle 40 is seen which is at an opposite side of the length adjusting pin 32.

Figure 5:
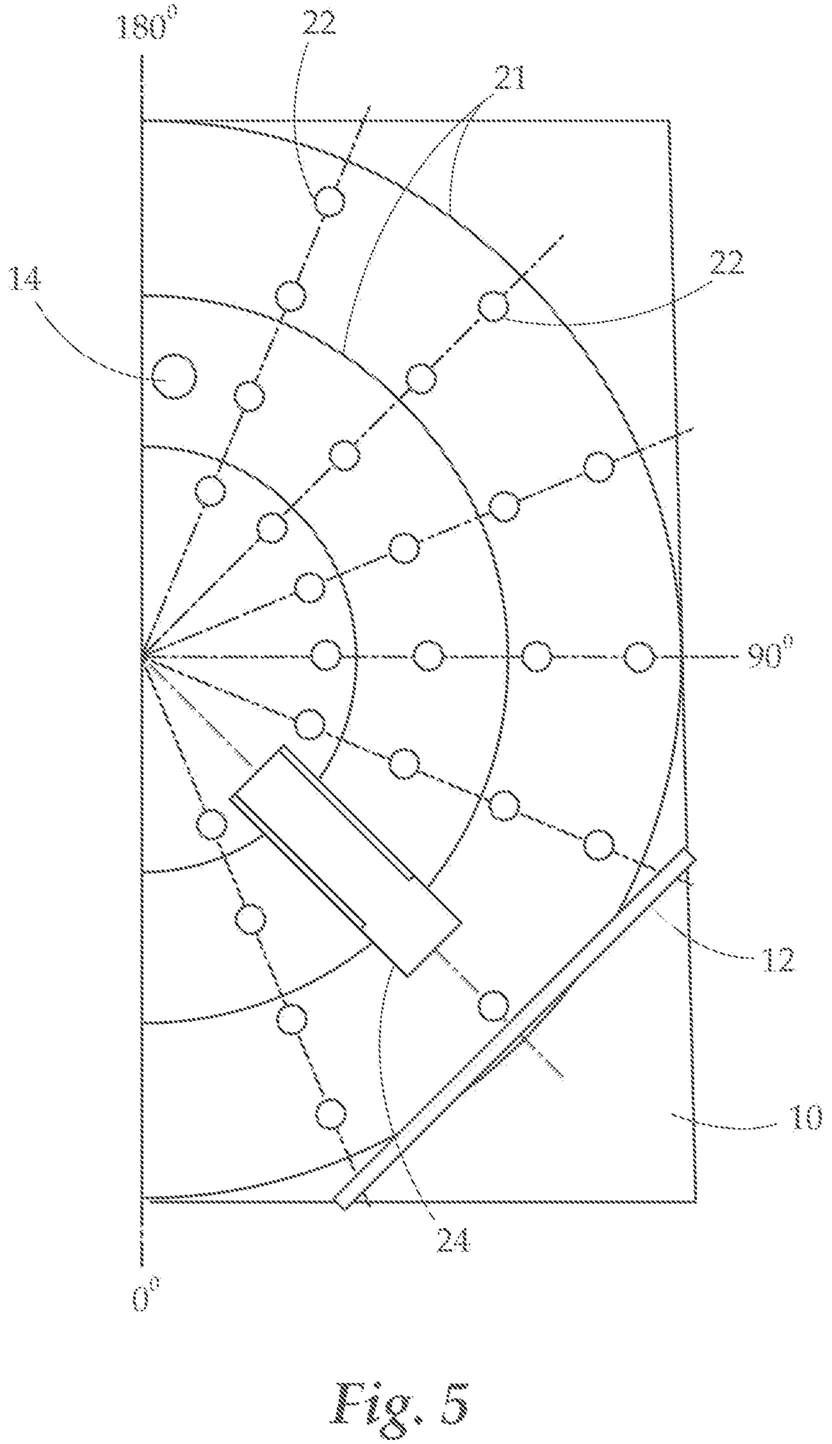
FIG. 5 provides an elevation view of an embodiment of the present invention.

FIG. 5 provides an elevation view of another embodiment of the present invention. In this view, axial rotation track 12 is positioned at a downward 45 degree angle from the straight out position. A number of peg holes 22 extend at the various angles along the board. Similarly, a number of tracks 21 extend along the board to guide movement of arm stabilizer 24. The highly customizable ability of the present invention is highlighted in this view because of the varied positions and movement tracks and limitations thereof that can be seen.

Figure 6:
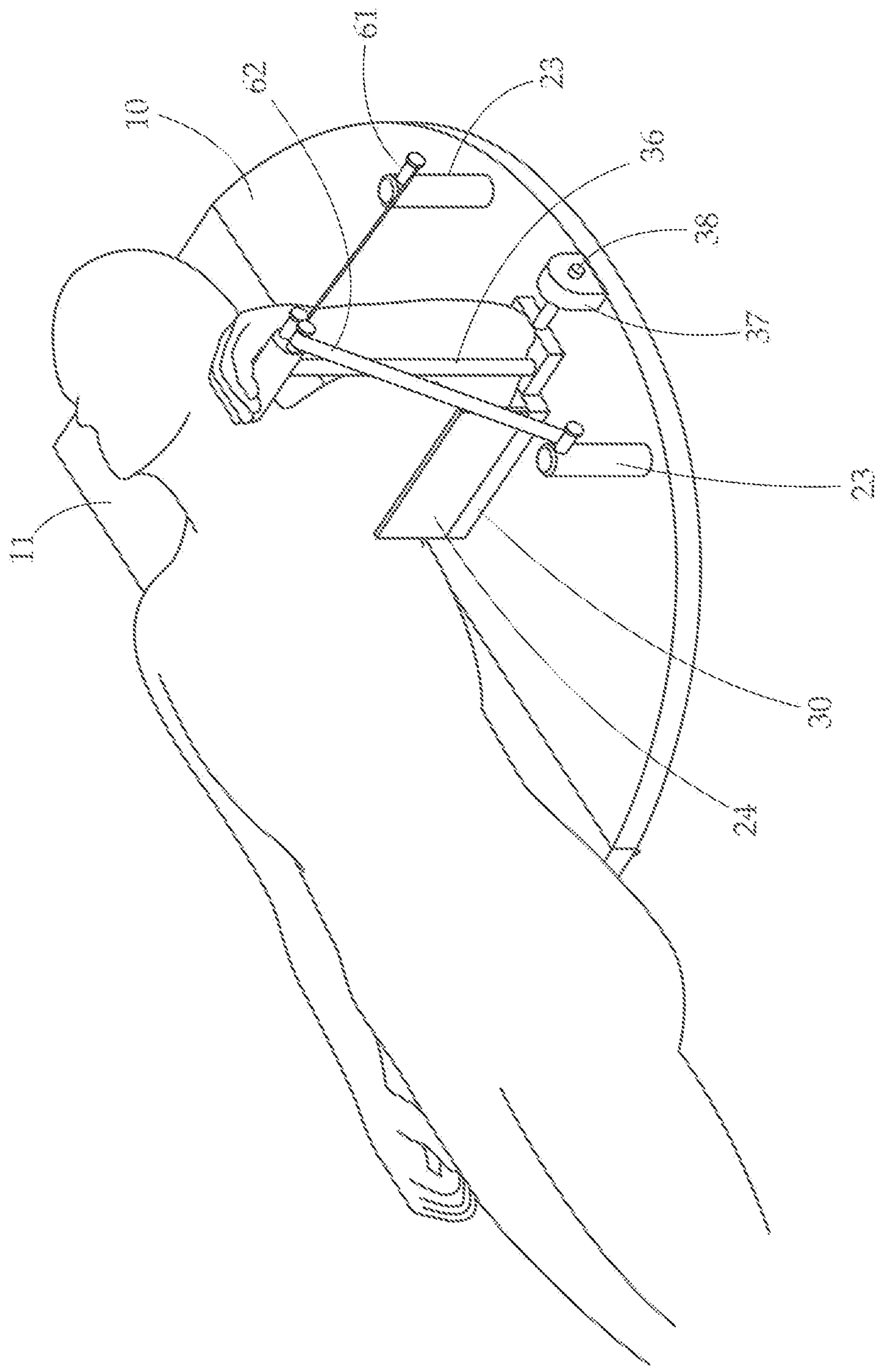
FIG. 6 provides a perspective view of still yet another embodiment of the present invention.

FIG. 6 provides a perspective view of another embodiment of the invention. In this view, a rotational strengthening of the shoulder joint may be achieved. In this embodiment, motion of the arm and shoulder joint may be achieved as discussed in embodiments above. In addition, the embodiment of FIG. 6 further comprises two resistance bands 62 which are formed of an elastic or other stretchable material. These bands 62 allow the user to rotate the shoulder against a predetermined amount of resistance in order to facilitate strengthening. Bands are removably connected, via connector 61, between the pegs 23 attached to the board 10, and hand grip 34. As with other embodiments, the pegs 23 may be moved to various positions along the board 10 depending on stage of rehabilitation or training, and desired range of motion. However in varying embodiments, the bands 62 may be connected to different portions of the arm stabilizer 24 without straying from the scope of this invention. The resistance bands 62 may also be attached to the pegs 23 when the pegs 23 are at various different positions on the board 10.

Figure 7:
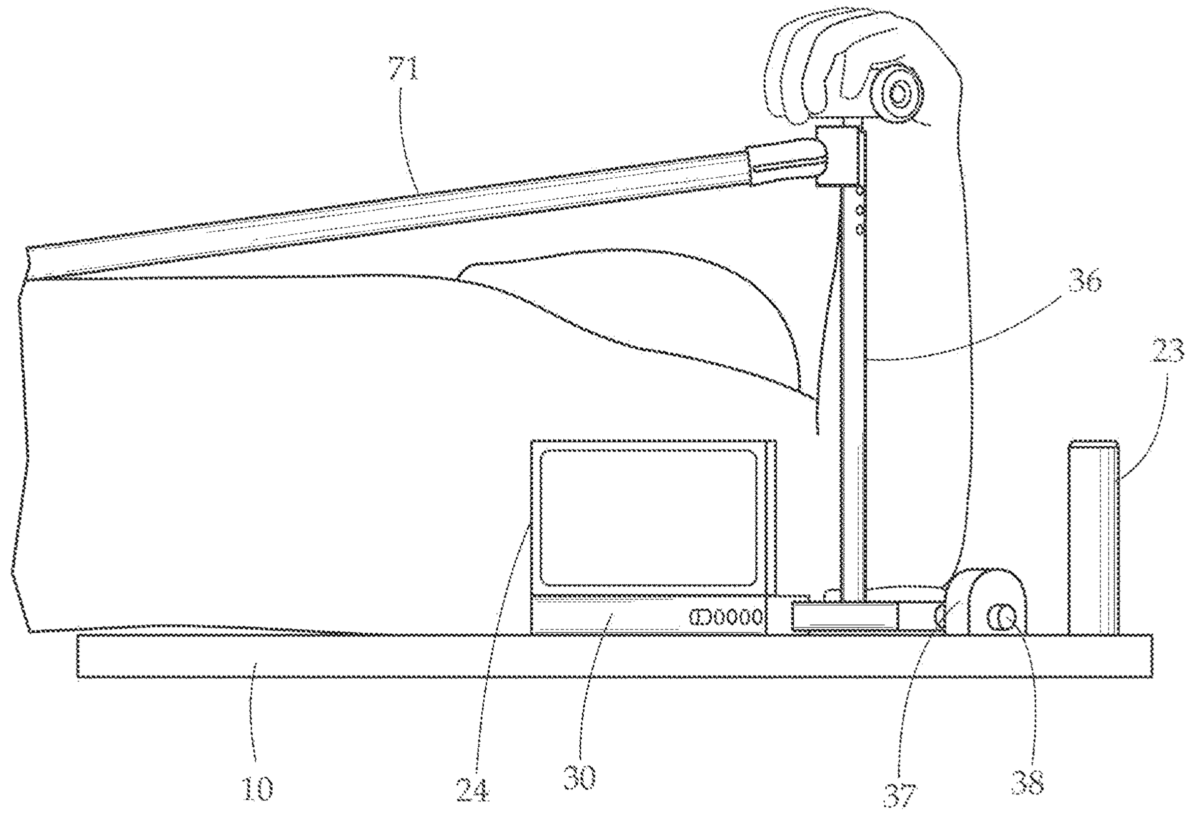
FIG. 7 provides a perspective view of another embodiment of the present invention.

FIG. 7 provides another view of an embodiment of the present invention. In this view, an embodiment similar to that of FIGS. 3 and 4 is shown. However, in this view a dowel 71 is connected to the upright shaft 36. The dowel 71 may be held by an opposite hand of the user, or by a trainer, to urge the arm on the arm stabilizer 24 to move. As shown, the dowel 71 is attached to the shaft 63 near the wrist. However, it should be understood that the dowel 71 may also attach by the elbow, or anywhere else along the shaft 36. The dowel 71 may connect to the shaft 36 in any manner, including a snap fit connection, magnetic connection, and the like. As noted, once connected, a user's healthy arm can move the opposite arm through a range of motion guided by the arm stabilizer 24 pivoting along the board 10 and, optionally, as limited by pegs 23.

Figure 8:
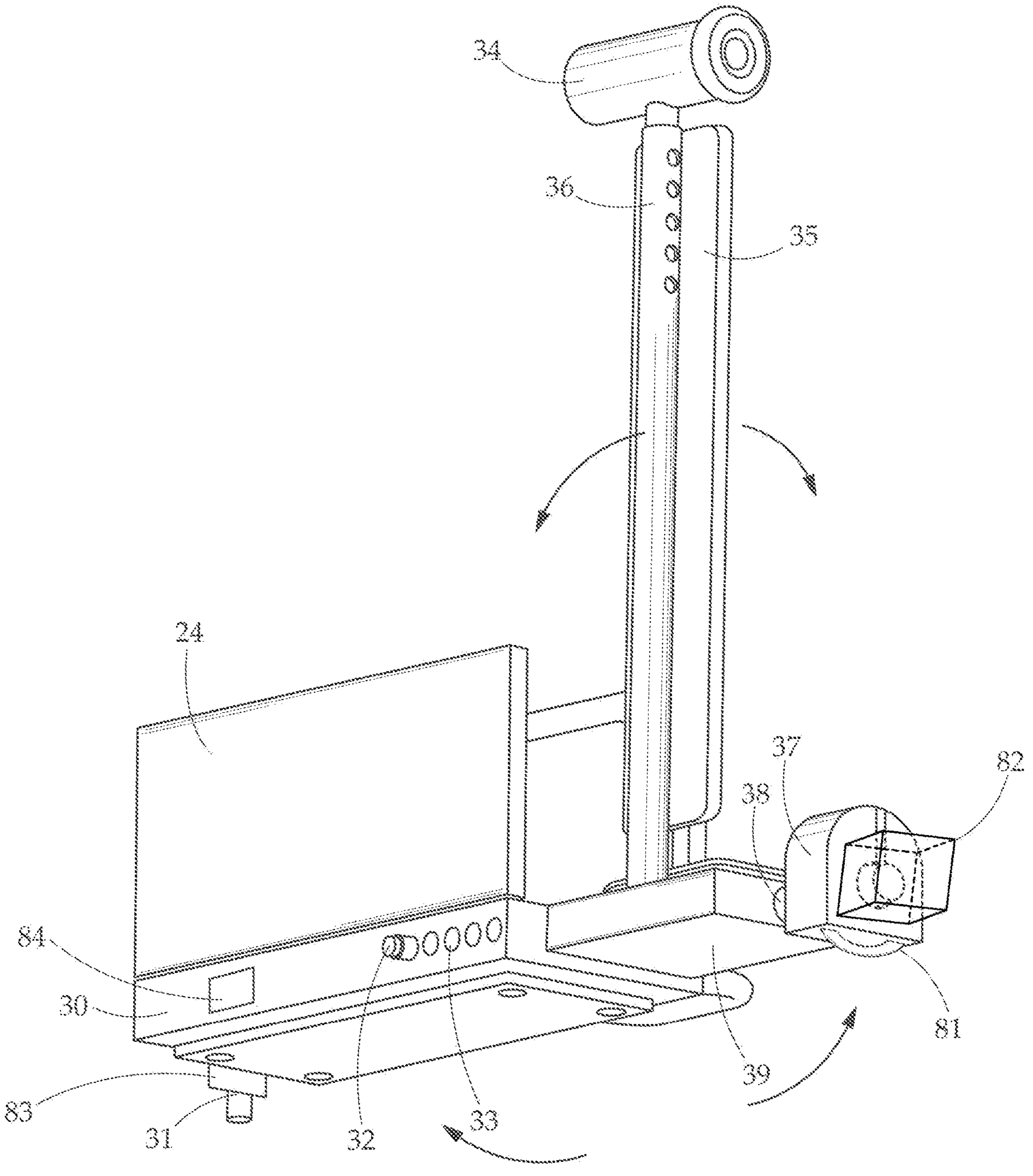
FIG. 8 provides a perspective view of yet another embodiment of an limb stabilizer of the present invention.
Figure 9:
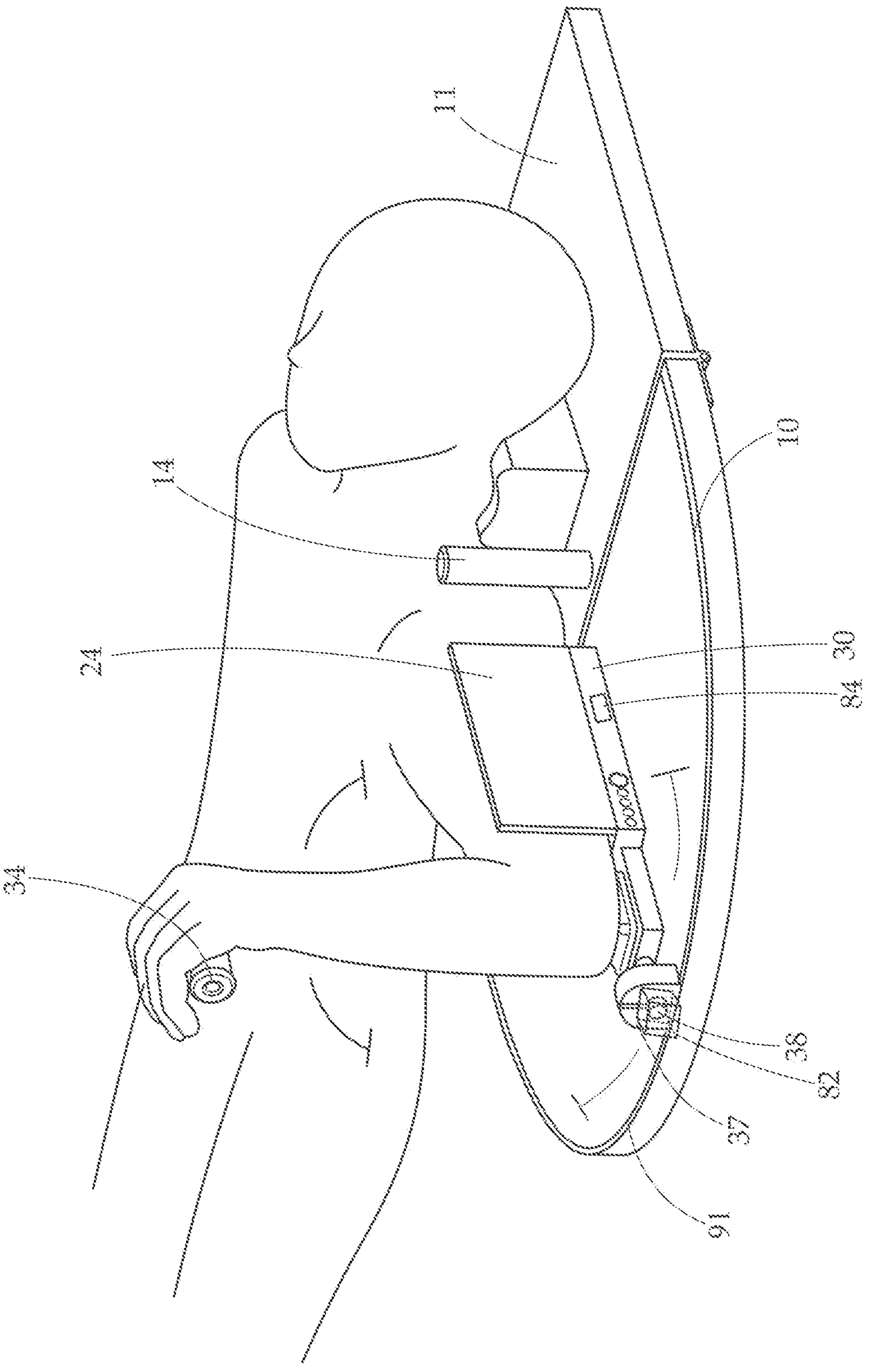
FIG. 9 provides a perspective view of another embodiment of an arm stabilizer of the present invention.

Turning to FIGS. 8 and 9, an embodiment of the limb training and stabilizing system is shown. In this view, the system is equipped for computer-controlled position tracking and/or movement which may be particularly helpful in telehealth applications, but which may also be used in any number of different settings. All embodiments disclosed herein may be used in conjunction with the computerized tracking and/or motion embodiments.

Telehealth is a rapidly growing and developing industry. It has substantial applications in the rehabilitation space because many patients are immobilized and their conditions make travel to a distant rehabilitation site such as a rehab center difficult if not impossible. Accordingly, a delivery of the limb training device of the present disclosure, coupled with remote tracking and optionally remote control of movement while a limb is on the board allows a therapist to track and control training and rehabilitation remotely. Further in other applications the computerized tracking and control allows for programming of the device to a set range of motion or motions, allowing a computer interface to automatically instruct and control training and rehabilitation by, for example, providing feedback if desired motion ranges are exceeded and/or locking or otherwise stopping motion of the device if it moves beyond the predetermined programmed range.

In the embodiments shown in FIGS. 8 and 9, the limb stabilizer has movement structure or structures and a location sensor or sensors to allow both tracking of location and controlled movement of the limb stabilizer along the table. The limb stabilizer, in this embodiment, is shown as an arm stabilizer 24 which supports an arm of a user. Of course, other limbs or portions of limbs, or body parts may be positioned on alternative versions a stabilizer base 30 sized and configured to receive the various body parts. Sensors, including a goniometer 37, pressure sensor, rotational sensor, or any other sensor which may determine orientation of the limb stabilizer 24 are connected to the limb stabilizer. The goniometer 37 is operable to determine a rotational position of the upright shaft 36, while a similar sensor 83 determines a pivotal position of the limb stabilizer 24 in a plane parallel to the plane of the table 10 based on the pivoting of pin 31. Of course, other sensor configurations may be used depending on embodiment and use.

In another embodiment, in addition to positional sensing, pressure sensors may be used to determine the amount of force being applied by the user. This information may be relayed to user and/or therapist computer for evaluation. In some cases, users may seek to increase force applied, while in others, it may be important for the user to not apply too much force to prevent injury.

In the embodiment shown, a control system allows programmable and remote movement of the limb stabilizer so as to control movement of a limb. This movement may be achieved by a wireless or wired connection with a computer and/or via a wireless data connection with a remote computer via the internet or other network. Control, in this embodiment, is achieved by a small motor 82 engaged with a pivoting shaft 38, which in turn causes upright shaft 36 to pivot in either direction downward and back to upright. Further motor 82 may control a wheel 81 which engages with a track 91 in the table 10. In this view, track 91 is shown as a recessed track. However, other track configurations may be used without straying from the scope of this disclosure. Upon a spinning of the wheel, the limb stabilizer 24 pivots about connection pin 31, and thus moves any limb which is engaged with the limb stabilizer. As can be envisioned, the mechanized limb stabilizer 24 is able to move in a number of different ways and in some cases multiple movements may be achieved simultaneously such as abduction/adduction and rotating shoulder motion.

Control of the sensors and movement systems is accessible remotely via wireless controller 84 which is in communication with the sensors and/or the movement systems. One or more processors are operable to receive programming instructions setting forth the acceptable ranges of motion, order of movement, speed of movement, and the like and then execute these instructions in a training program.

Figure 10:
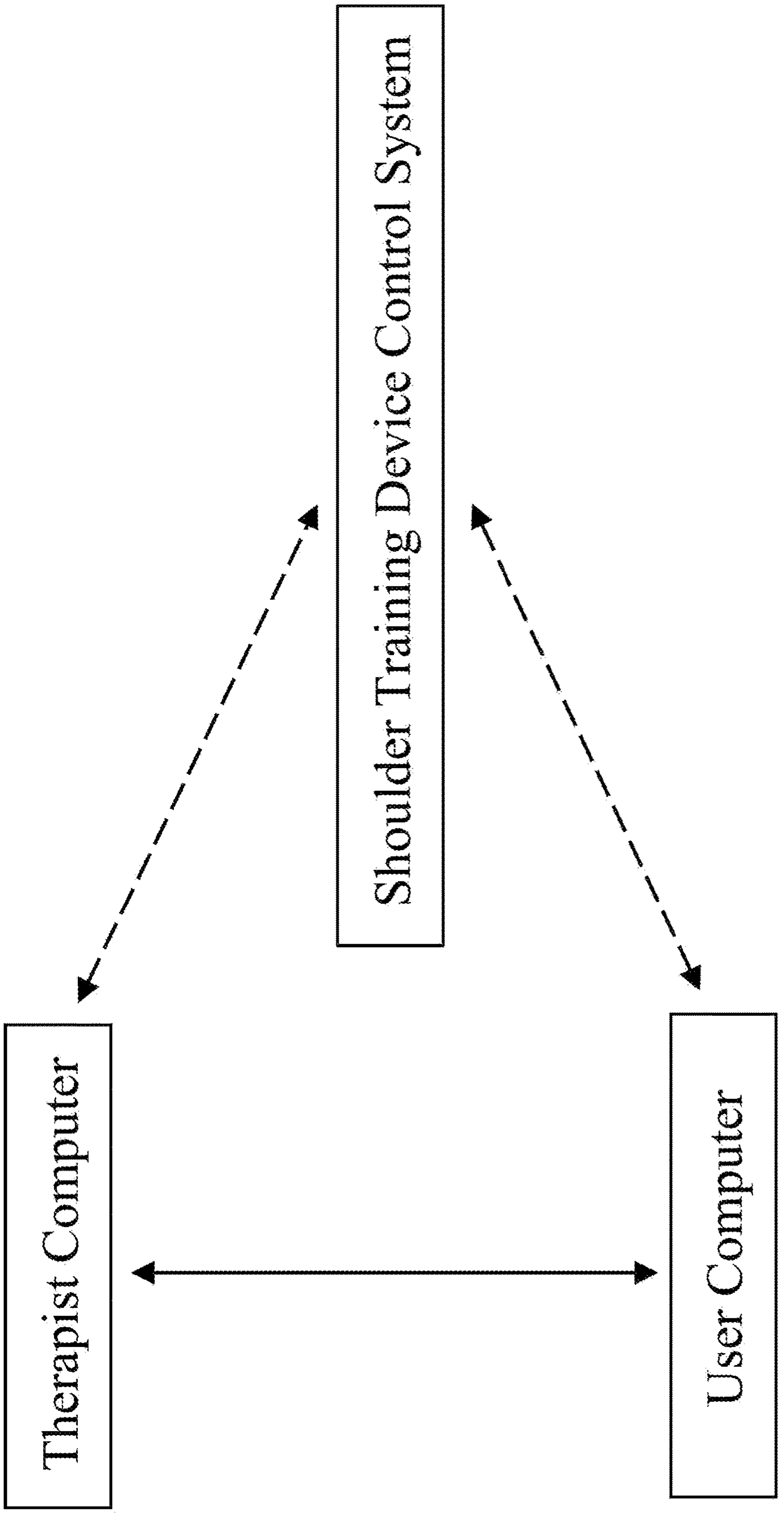
FIG. 10 provides a flow chart of an embodiment of a telehealth application of the present disclosure.

In an embodiment of operation, shown in FIG. 10, the remotely accessible limb stabilizer system may be used for a telehealth appointment of shoulder rehabilitation. A user may access a video conference with a therapist such that the therapist is able to view and communicate with the user. The therapist may send a signal from his or her computer either to the limb stabilizer system via, for example, its wireless controller or to a user computer, which in turn is in communication with the system. In an embodiment wherein the therapist desires to limit movement but allow user control, range limitations may be sent to the limb stabilizer device. The sensors 37, 83 may track movement and location of the limb based on device position. Of course, other embodiments of remote training may be achieved such as selfdirected training or rehabilitation allowing the user to self-program the operational range of motions, movement and movement pattern and order, and the like.

When reaching the limits of the predetermined movement range, the system may be configured in a number of different ways to prevent exceeding the range of motion. Exceeding range of motion may result in further injury, undesired tissue stretching, reduced mobility, and the like. In one embodiment, the movement systems such as motor 82 may physically stop movement beyond a predetermined range by preventing motion of the device. In another embodiment, a visual display of the position relative to the limited movement range may be presented in a user interface visible to the user and/or the therapist or trainer. The therapist or trainer may use verbal commands to the user to inform the user that the movement range is being approached or has been exceeded. In another embodiment, an alert may be provided such as a visual alert, tactile alert (via a vibration or the like on the limb stabilizer), and/or an audible alert. Other embodiments may use combination of a stopping and an alert to prevent exceeding of the movement ranges. It should be understood that there are multiple ranges of motion that can be achieved by the limb stabilizer of the present disclosure, especially in shoulder training embodiments. Ranges of motion can be selected for some or all of these ranges by the system.

In similar telehealth embodiments, a telehealth therapist, trainer, physician, or the like may program a movement regimen to cause the limb stabilizer 24 to move in a particular manner and pattern. The program instructions may be sent from the computer to a processor and memory on the limb stabilizer or elsewhere on the training device and may cause the limb stabilizer to move as programmed. In one embodiment, the therapist may use videoconferencing to view the progress and communicate with the system user. In another embodiment, the device may be pre-programmed by the trainer and a user may position himself on the device, and activate it and the pre-programmed operation begins. It should be understood that the noted instances of programmability also refer to re-programmability and that the system may be programmed and reprogrammed for any number of various operational parameters.

In one embodiment, wherein the training and rehabilitation device has computerized components including a processor and memory, the device may be in electronic communication with a remote server which stores Electronic Medical Records. This communication may be between the device and server in one embodiment, and/or the device may be connected to the server through a connection with a user computer or therapist/trainer computer. In such an embodiment, the training sessions and details thereof, including specifics on what movements were performed and ranges trained may be stored in the Electronic Medical Record corresponding to the device user. In another embodiment, the user computer and/or training computer may send information about the ranges and movements performed directly instead of the device sending this information. As such, the device is operable to be used to record a session and then have information related to the session be uploaded to an accessible source where a health care provider is able to access the information such as a doctor's office, therapist, and the like. This may also provide the advantage of continuity and easy reference for a new or different therapist for the user.

In another embodiment the training and rehabilitation device may comprise a memory comprising a servicing program stored thereon. The servicing program may allow for assessment and calibration of the functionality of the device. The networked connection of the device may in turn allow communication of a service and/or calibration status and may allow for receipt of a calibration or service inquiry to initiate the programming. As is required by regulations in the related device field, there is a requirement that such devices are serviced periodically to ensure that they are in good working condition over time. Accordingly, in some embodiments it may be advantageous to allow the device to communicate a status indication regarding its operability remotely without requiring a service person to physically be present at the device. In one embodiment of calibration, the program may use known points to determine if the device is on calibration, and/or calibrate or recalibrate. For example, known points may be at a maximum limited movement range, and/or at a central up/down or central pivot upright position. In operation, a user, or in some cases the device movement structures themselves moves the limb stabilizer to one maximum limited range and records information from the sensor(s), marking the signal from the senor, and then the limb stabilizer may be moved to the other of the maximum limited range and marking the signal from the sensor. With this information, the device status may be determined and compared to previous known sensor readings. Of course other embodiments of the self-service features may be implemented without straying from the scope of the present disclosure. Further in other embodiments, rather than a memory on the training device itself storing the program instructions, a computer which is in electronic communication with the device may store the service program instructions.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A system for guided limb movement, the system comprising:

a limb movement board;

a limb stabilizer pivotable about a pivotal connection of the limb stabilizer to the limb movement board, wherein the limb stabilizer comprises a location sensor operable to determine a position of the limb stabilizer with respect to the limb movement board, the limb stabilizer is an arm stabilizer for movement of a shoulder joint, and the limb stabilizer further comprises a motor operable to cause a movement of the limb stabilizer relative to the limb movement board to cause at least one of abduction or adduction of a shoulder and shoulder internal and external rotation; and a computer, in communication with the location sensor by a data connection between the location sensor and the computer.

2. The system of claim 1, wherein the data connection comprises one or more network connections and the computer is remote from the limb movement board and the limb stabilizer.

3. The system of claim 1, wherein the computer further comprising a display and location data associated with the position of the limb stabilizer and provided by the location sensor is presented on the display.

4. The system of claim 3, wherein the computer is further operable to provide an alert if the location sensor indicates a location or a position of the limb stabilizer beyond a range of motion.

5. The system of claim 1, further comprising memory and a processor in communication with the location sensor and the memory, wherein the processor is operable to cause at least one of a sound, light, or vibration to emit if the location sensor indicates a location beyond a range of motion.

6. The system of claim 1, wherein the computer further comprises a display and a camera operable to record a video, wherein the display is operable to present a video feed from a second computer to allow videoconferencing between users of the computer and the second computer.

7. The system of claim 1, wherein the limb stabilizer further comprises a motor operable to cause a movement of the limb stabilizer relative to the limb movement board.

8. The system of claim 7, further comprising memory and a processor in communication with the location sensor, wherein the processor is operable to execute instructions stored in the memory to cause the motor to selectively stop a movement of the limb stabilizer.

9. The system of claim 1, wherein the limb stabilizer comprises an upwardly extended portion movable in a direction towards and away from a top surface of the limb movement board to provide internal and external rotation for a shoulder of an arm being stabilized thereon.

10. The system of claim 1, wherein the data connection is in communication with an Electronic Medical Records database.

11. The system of claim 1, wherein the location sensor is a goniometer.

12. The system of claim 11, wherein the goniometer comprises a programmable memory operable to store instructions relating to a range of motion measurable by the goniometer.

13. The system of claim 1, further comprising memory and a processor in communication with the location sensor, and wherein the memory comprises instructions operable, when executed by the processor, to calibrate the location sensor.

14. The system of claim 1, wherein the limb movement board is connected on one edge to a table.

15. A method of using the system of claim 1, the method comprising:

positioning an arm of a user on the limb stabilizer; and moving the limb stabilizer to in turn move the arm of the user.

16. A system for guided limb movement, the system comprising:

a limb movement board;

a limb stabilizer pivotally connected to the limb movement board and pivotable about a pivotal connection of the limb stabilizer to the limb movement board, wherein the limb stabilizer comprises a location sensor operable to determine a position of the limb stabilizer with respect to the limb movement board and the limb stabilizer comprises an upwardly extended portion movable in a direction towards and away from a top surface of the limb movement board to provide internal and external rotation for a shoulder of an arm being stabilized thereon;

a motor in communication with the upwardly extended portion and operable to move the upwardly extended portion in the direction towards and away from the top surface of the limb movement board to provide internal and external rotation for the shoulder; and a computer in communication with the location sensor by a data connection between the location sensor and the computer.

17. A system for guided limb movement, the system comprising:

a limb movement board;

a limb stabilizer pivotally connected to the limb movement board and pivotable about a pivotal connection of the limb stabilizer to the limb movement board, wherein the limb stabilizer comprises a location sensor operable to determine a position of the limb stabilizer with respect to the limb movement board and the limb stabilizer comprises an upwardly extended portion movable in a direction towards and away from a top surface of the limb movement board to provide internal and external rotation for a shoulder of an arm being stabilized thereon;

a dowel connectable to the upwardly extended portion and operable to cause a movement of the upwardly extended portion; and a computer in communication with the location sensor by a data connection between the location sensor and the computer.

18. A system for guided limb movement, the system comprising:

a limb movement board;

a limb stabilizer pivotally connected to the limb movement board and pivotable about a pivotal connection of the limb stabilizer to the limb movement board, wherein the limb stabilizer comprises:

a location sensor operable to determine a position of the limb stabilizer with respect to the limb movement board; and a motor operable to cause a movement of the limb stabilizer relative to the limb movement board, wherein the motor is in communication with a wheel engaged with a surface of the limb movement board and a movement of the wheel by the motor causes a movement of the limb stabilizer along the limb movement board; and a computer in communication with the location sensor by a data connection between the location sensor and the computer.

19. The system of claim 18, wherein the limb movement board further comprises a recessed track and the wheel is engaged with the recessed track.

* * * * *